(12) United States Patent
Jariwala (10) Patent No.: US 11,883,778 B2
(45) Date of Patent: Jan. 30, 2024

(54) CARBON DIOXIDE AND HYDROGEN SULFIDE RECOVERY SYSTEM USING A COMBINATION OF MEMBRANES AND LOW TEMPERATURE CRYOGENIC SEPARATION PROCESSES

(71) Applicant: Cameron Solutions, Inc., Houston, TX (US)

(72) Inventor: Ankur D. Jariwala, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 334 days.

(21) Appl. No.: 16/476,579

(22) PCT Filed: Jan. 9, 2018

(86) PCT No.: PCT/US2018/012856
§ 371 (c)(1),
(2) Date: Jul. 9, 2019

(87) PCT Pub. No.: WO2018/132339
PCT Pub. Date: Jul. 19, 2018

(65) Prior Publication Data
US 2019/0358583 A1  Nov. 28, 2019

Related U.S. Application Data

(60) Provisional application No. 62/444,443, filed on Jan. 10, 2017.

(51) Int. Cl.
*F25J 3/00* (2006.01)
*B01D 53/22* (2006.01)
(Continued)

(52) U.S. Cl.
CPC .......... *B01D 53/229* (2013.01); *C01B 17/167* (2013.01); *C01B 32/50* (2017.08);
(Continued)

(58) Field of Classification Search
CPC .... F25J 3/0214; F25J 2210/80; F25J 2215/80; F25J 2205/80; F25J 3/067; F25J 3/0266; B01D 53/185
See application file for complete search history.

(56) References Cited

U.S. PATENT DOCUMENTS 4,581,052 A      4/1986  Adler et al.
4,639,257 A  *   1/1987  Duckett ................. C01B 21/04
                                              62/624

(Continued)

FOREIGN PATENT DOCUMENTS

JP    H0970521 A  *  3/1997
JP    10059705 A     3/1998

(Continued)

OTHER PUBLICATIONS

Extended Search Report issued in EP Application 18738723.8, dated Sep. 2, 2020 (7 pages).

(Continued)

*Primary Examiner* — Brian M King
(74) *Attorney, Agent, or Firm* — Jeffrey D. Frantz (57) ABSTRACT

An acid gas purification system is described herein that includes a primary membrane system with a $CO_2$- and $H_2S$-enriched permeate stream effluent and a hydrocarbon stream effluent; a first compression stage arranged to receive the $CO_2$- and $H_2S$-enriched permeate stream and produce a compressed stream; and a cryogenic separation system to receive the compressed stream, the cryogenic separation system including a cooler followed by a fractionator, wherein the fractionator produces a $CO_2$- and $H_2S$ liquid stream and a hydrocarbon gas stream.

14 Claims, 4 Drawing Sheets

(51) Int. Cl.
*C01B 32/50* (2017.01)
*C01B 17/16* (2006.01)
*C10G 70/04* (2006.01)
*C10L 3/10* (2006.01)
*F25J 3/06* (2006.01)
*F25J 3/02* (2006.01)

(52) U.S. Cl.
CPC ............ *C10G 70/045* (2013.01); *C10L 3/103* (2013.01); *C10L 3/104* (2013.01); *F25J 3/0266* (2013.01); *F25J 3/067* (2013.01); *B01D 2053/221* (2013.01); *C10G 2300/207* (2013.01); *C10L 2290/06* (2013.01); *C10L 2290/46* (2013.01); *C10L 2290/543* (2013.01); *C10L 2290/548* (2013.01); *F25J 2205/80* (2013.01); *F25J 2215/80* (2013.01); *F25J 2220/66* (2013.01)

(56) References Cited

U.S. PATENT DOCUMENTS

| | | | |
|---|---|---|---|
| 5,983,663 | A | 11/1999 | Sterner |
| 7,124,605 | B2 | 10/2006 | Parro et al. |
| 7,152,430 | B1 | 12/2006 | Parro |
| 9,823,016 | B2 * | 11/2017 | Valencia ................ F25J 3/08 |
| 2011/0247360 | A1 * | 10/2011 | Hasse ................ F25J 3/067 62/606 |
| 2012/0111051 | A1 * | 5/2012 | Kulkarni ................ C10L 3/104 62/619 |
| 2013/0283851 | A1 * | 10/2013 | Higginbotham ..... B01D 53/002 62/606 |
| 2015/0159943 | A1 * | 6/2015 | Valencia ................ F25J 1/0022 62/625 |
| 2015/0210936 | A1 * | 7/2015 | Burgers ................ C10L 3/104 196/46 |
| 2015/0240717 | A1 * | 8/2015 | Starcher ................ F02C 3/24 60/780 |

FOREIGN PATENT DOCUMENTS

| | | |
|---|---|---|
| WO | 2006037320 A1 | 4/2006 |
| WO | 2011014345 A1 | 2/2011 |
| WO | 2011090553 A1 | 7/2011 |
| WO | 2014/005817 A1 | 1/2014 |

OTHER PUBLICATIONS

Shimekit, et al., "Natural gas purification technologies—Major advances for CO2 separation and future directions," in: Advances in Natural Gas Technology, 2012, pp. 235-270.

International Search Report and Written Opinion for the equivalent International patent application PCT/US2018/012856 dated Apr. 27, 2018.

International Preliminary Report on Patentability issued in the related PCT Application PCT/US2018/012856, dated Jul. 16, 2019 (9 pages).

* cited by examiner

CARBON DIOXIDE AND HYDROGEN SULFIDE RECOVERY SYSTEM USING A COMBINATION OF MEMBRANES AND LOW TEMPERATURE CRYOGENIC SEPARATION PROCESSES

CROSS-REFERENCE TO RELATED APPLICATIONS

This application claims benefit of U.S. Provisional Patent Application Ser. No. 62/444,443 filed Jan. 10, 2017, which is incorporated herein by reference.

BACKGROUND

This invention relates to systems and methods that make use of membrane technology to remove carbon dioxide ($CO_2$) and hydrogen sulfide ($H_2S$) from a gas stream.

Removing $CO_2$ and $H_2S$ from gas using membranes is a well-known process. The membranes typically separate the gas into two streams, a $CO_2$- and $H_2S$-enriched low pressure stream as permeate and a $CO_2$- and $H_2S$-depleted high pressure stream as a product gas. Such processes are often used to help purify natural gas where standard cryogenic fractionation processes are limited by azeotrope formation between $CO_2$ and ethane ($C_2H_6$).

Figure 1:
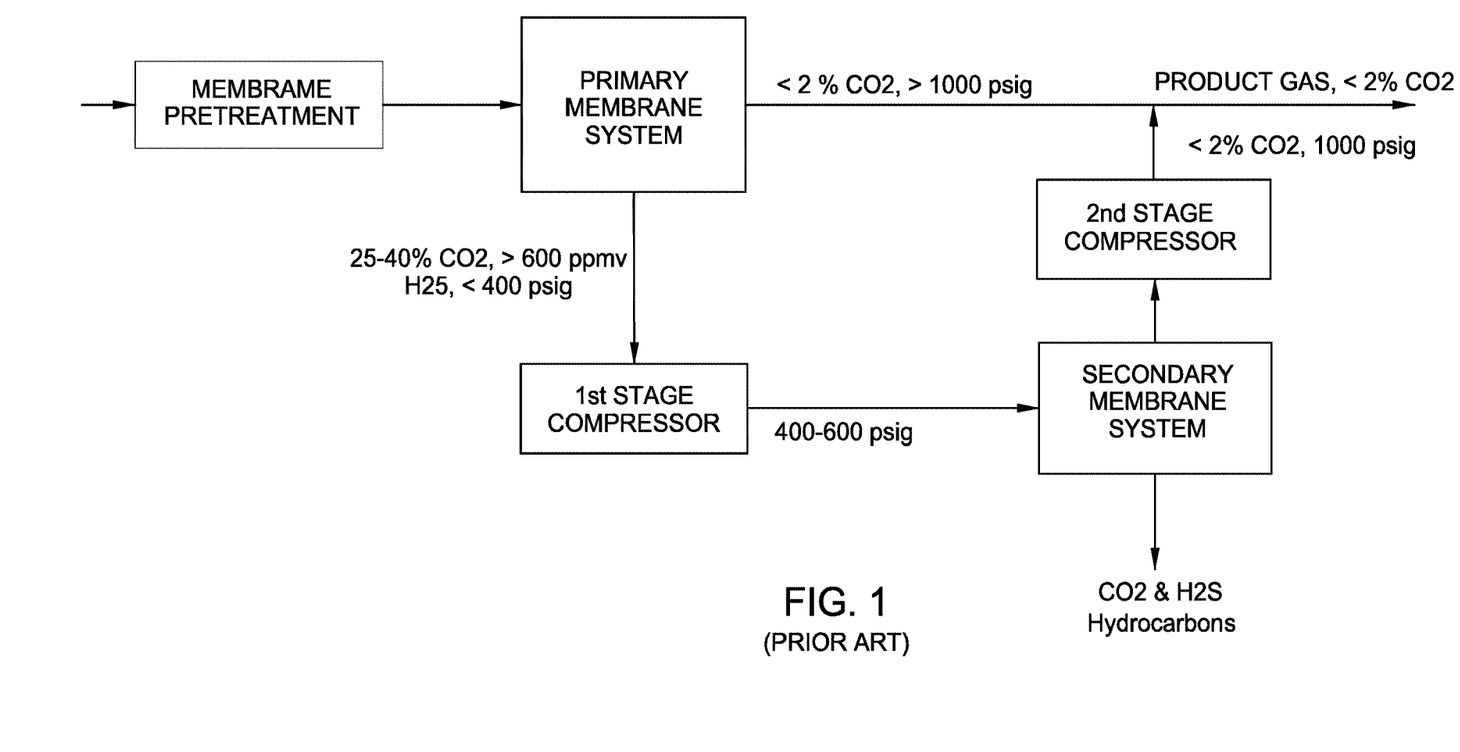
FIG. 1 is a schematic flow diagram of a prior art $CO_2$ and $H_2S$ removal system.

FIG. 1 is a schematic flow diagram of a conventional $CO_2$ and $H_2S$ separation system. In a single-step membrane separation process, the $CO_2$- and $H_2S$-enriched low pressure permeate stream contains additional hydrocarbons which are usually lost unless the permeate stream is passed through a secondary membrane system, as in FIG. 1. The secondary membrane system requires a compression step followed by another membrane step to recover the hydrocarbons and reduce $CO_2$ and $H_2S$. The product stream from the secondary membrane system also needs compression to the pressure of the product from the primary membrane system so the two can be mixed.

Generally speaking, the membrane technology approaches require several membranes and large compressors, making it both capital-intensive and inefficient. Each successive membrane step requires recompression of the permeate from the last membrane step, along with compression of the product from the membrane step to combine with the higher pressure product from the last membrane step. This is a major hurdle to implementing membrane technology for gas stream applications. A need exists to optimize primary membrane stream processing and reduce the overall compression requirements and capital cost.

U.S. Pat. No. 7,152,430 B1 to Parro reduces the amount of $CO_2$ in a feed gas stream by using fractional distillation that provides a $CO_2$-rich bottom stream and a $CO_2$-lean distillation overhead stream. The $CO_2$-lean distillation overhead stream is passed through a membrane unit to produce a low-pressure $CO_2$-rich stream and a hydrocarbon stream. The hydrocarbon stream is chilled to produce a reflux liquid stream and a hydrocarbon gas product. The low-pressure $CO_2$-rich stream is further compressed and mixed with the overhead of the fractionation reflux drum.

SUMMARY

Some embodiments of acid gas purification systems described herein include An acid gas purification system, comprising a primary membrane system with a $CO_2$- and $H_2S$-enriched permeate stream effluent and a hydrocarbon stream effluent; a first compression stage arranged to receive the $CO_2$- and $H_2S$-enriched permeate stream and produce a compressed stream; and a cryogenic separation system to receive the compressed stream, the cryogenic separation system including a conditioner followed by a fractionator, wherein the fractionator produces a $CO_2$- and $H_2S$ liquid stream and a hydrocarbon gas stream.

Other embodiments of acid gas purification systems described herein include a membrane separation unit that produces a permeate stream enriched in $CO_2$ and/or $H_2S$ and a retentate stream from a feed stream; a conditioner to reduce a temperature of the permeate stream; and a cryogenic fractionator to separate acid gases from the cooled permeate stream.

Other embodiments of acid gas purification systems described herein include a non-distillation separation system with an acid gas effluent and a separation gas effluent, wherein the non-distillation separation system is a single step separation and the acid gas effluent is at least 90 mol % $CO_2$ and/or $H_2S$; and a cryogenic fractionation system including a conditioner and a fractionator.

BRIEF DESCRIPTION OF THE DRAWINGS

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION OF THE PREFERRED EMBODIMENTS

Figure 2:
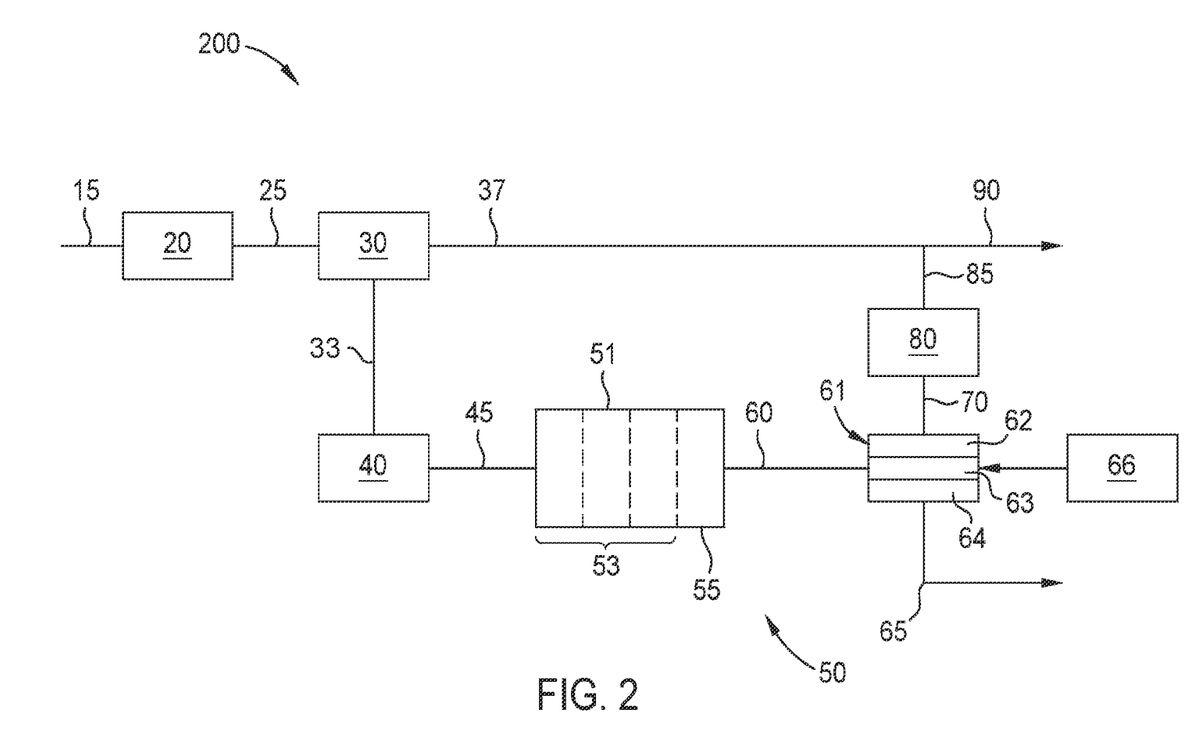
FIG. 2 is a schematic flow diagram of an acid gas removal system according to one embodiment.

FIG. 2 is a schematic flow diagram of an acid gas recovery system 200 according to one embodiment. The acid gas recovery system 200 combines a primary membrane system 30 with low temperature cryogenic separation system 50 that includes a conditioner 51 and a fractionation column 61.

A feed gas stream 15, which may be a natural gas stream, a combustion effluent stream, an air fraction stream, or another gas stream containing $CO_2$ and/or $H_2S$ is charged to a pretreatment unit 20. The pretreatment unit 20 can filter the feed gas stream 15, remove water, dehydrate, and condition the feed gas stream 15 to a dew point thereof, producing a pretreated feed gas stream 25. The feed gas is typically at least 10 mol % acid gases ($CO_2$ and $H_2S$), for example 10-11 mol % $CO_2$, with the balance mostly light hydrocarbons such as methane and ethane. There may be a few heavier hydrocarbons such as propane and butane in the feed gas stream, on occasion, but if present the concentration of such gases is normally less than about 0.5 mol %. In some cases the concentration of acid gases may be less than 10 mol %, as noted below.

The pretreated feed gas stream 25 enters a membrane system 30 at high pressure (up to 2000 psig) where the membrane system 30 separates the stream 25 into a $CO_2$- and $H_2S$-enriched low pressure stream as permeate 33 (<400 psig) and a $CO_2$- and $H_2S$-depleted high pressure stream as a product gas 37 (>1000 psig). The membrane system 30 includes a membrane separator with a polymeric membrane element. Examples of membrane systems that can be used include the CYNARA and APURA membrane systems available from the Process Solutions and Systems unit of Schlumberger Technology Corporation of Houston, Tex. Other membrane systems for high selectivity separation of acid gases such as $CO_2$ and $H_2S$ from hydrocarbons may be used. The permeate stream 33 is at least 90 mol % acid gases $CO_2$ and $H_2S$. Because the primary membrane system 30 recovers a maximum amount of ethane and heavy hydrocarbons in the product gas 37, only a small amount of ethane and heavy hydrocarbons are permeated in the low pressure permeate stream 33. The product gas 37 has no more than 10 mol % acid gases.

The permeate stream 33 is compressed to 400-600 psig pressure in a first-stage compressor 40, which may be a multi-stage compression unit with interstage condensate handling. The compressed stream 45 enters the cryogenic separation system 50 at a conditioner 51 thereof, and is cooled in the conditioner 51 that includes a series of heat exchangers 53 followed by cooling to −60° F. to −140° F. (about −51° C. to −96° C.) temperature in an inlet chiller 55. The cryogenically cooled stream 60 then enters a fractionator 61. When a multi-stage compression unit is used for the compressor 40, any interstage liquids that are desirous of recovery may be routed to the conditioner 51 for recovery in the fractionator 61.

The fractionator 61 should be able to handle multiple phases of $CO_2$ and $H_2S$ under variable temperature conditions to achieve a desired separation. The fractionator 61 includes a stripping section 64 of the fractionator 61 and a rectification section 62 of the fractionator 61 in fluid communication with each other. Between the stripping section 64 and the rectification section 62, the fractionator 61 can have different mid-section features 63 to handle $CO_2$ and $H_2S$ phase changes. For example, the mid-section 63 of the fractionator 61 may include a space for nucleating crystals that then fall into the top of the rectifying section 62 and melt. The fractionator 61 may also have a side processor 66 at the middle section 63 of the fractionator 61 to process a sidestream from the stripping section 64 and return a condensed stream to the rectifying section 62 of the fractionator 61.

The side processor may address formation of solids in different ways. For example, the side processor may include an empty section for nucleating crystals that fall into a warmer liquid, which is then returned to the fractionator 306 (shown in FIGS. 3 and 4). The side processor may include a condenser that produces a liquid level in the side processor for bubbling the vapor taken from the stripping section of the fractionator 306 and stripping $CO_2$ from the vapor.

In other embodiments, the fractionator 61 may be two or more distillation columns. For example, a first distillation column may be a stripping section of the fractionator 61 while a second distillation column is a rectification section of the fractionator 61. Equipment can be provided between the two columns to handle phase changes, as necessary. In such embodiments, the first column is sometimes operated at lower pressure than the second column. Compression and cooling of a stream from the first column for feeding to the second column can produce solid $CO_2$, which can be separated, melted, and added to the $CO_2$ product of the second column.

Most $CO_2$ and $H_2S$ from the cryogenically cooled stream 60 emerges from the fractionator 61 as a liquid stream 65 in the bottom/reboiler section of the fractionator 61. In an example operation at about 500 psig pressure, the bottom liquid stream is reboiled at a temperature of about 10° C., while the overhead is condensed at a temperature of about −50° C. If pressure of the fractionator 61 is controlled to a certain target, and if the fractionator 61 operation is controlled to deliver purified $CO_2$ and $H_2S$ stream as a bottoms stream, fluctuations in composition of the cryogenically cooled stream 60 will cause fluctuations in operating temperatures of the fractionator 61. The $CO_2$ and $H_2S$ bottoms stream 65 contains less than 10% of the amount of non-$OO_2$ and $H_2S$ (mostly hydrocarbon) compounds. The bottoms stream 65 (i.e. the bottoms section of the fractionator 61) can be at 300-600 psig pressure, and can be further conditioned to increase the temperature to higher than 40° F. (about 4° C.).

The hydrocarbon-rich gas 70 is separated at the reflux drum overhead of the fractionator 61, with a lower temperature of the overhead being maintained thorough a condenser. The reflux/condensation process reduces the total amount of $CO_2$ and $H_2S$ leaving the reflux drum overhead in the hydrocarbon stream 70. The amount of $CO_2$ and $H_2S$ in the reflux drum overhead hydrocarbon-rich stream 70 can be adjusted to manage composition of the final hydrocarbon product stream 90, which is the mixture of the primary membrane product gas 37 and the overhead stream 70. The overhead stream 70 can be further compressed in a second stage compressor 80 at pressure to form a compressed overhead stream 85 that matches pressure with the primary membrane product gas 37.

A significant number of membrane modules/surface area and recycle compression can be reduced using this novel approach. For a feed gas of 10-11 mol % inlet $CO_2$, at 1000 psig and 61° F. (about 21° C.) inlet conditions, at a rate of 840 MIVISCFD, and producing a product gas with less than 2% $CO_2$ and less than 2% hydrocarbon losses in the permeate stream, use of a cryogenic fractionation system as described herein can reduce the need for membranes by 50% or more, and the need for compression to drive the membranes by 30% or more.

Combining the primary membrane system 30 with the cryogenic separation system 50 can be applied, for example, in a liquefied natural gas pretreatment plant where $CO_2$ in the feed gas can vary from 2% to 40% or higher. In cases where $CO_2$ from a hydrocarbon production facility is to be re-injected into the reservoir, the system 200 can help reduce the overall re-injection cost of $CO_2$ and $H_2S$ by producing the re-injection gas as a liquid for pumping directly into the ground, avoiding the cost of compressing a gas for re-injection. This also avoids any sulfur plant requirement to manage $H_2S$ downstream. A purified liquid $CO_2$ product stream can also be advantageous for enhanced oil recovery techniques, where $CO_2$ is sometimes used as a hydrocarbon mobilant in hydrocarbon reservoirs, and where compressing a gas to reservoir pressure can be avoided. Other uses of liquid $CO_2$ may include manufacture of methanol, semiconductor processes that utilize supercritical $CO_2$, mechanical uses of liquid $CO_2$ in pressure bottles, and various medical uses of $CO_2$.

Figure 3:
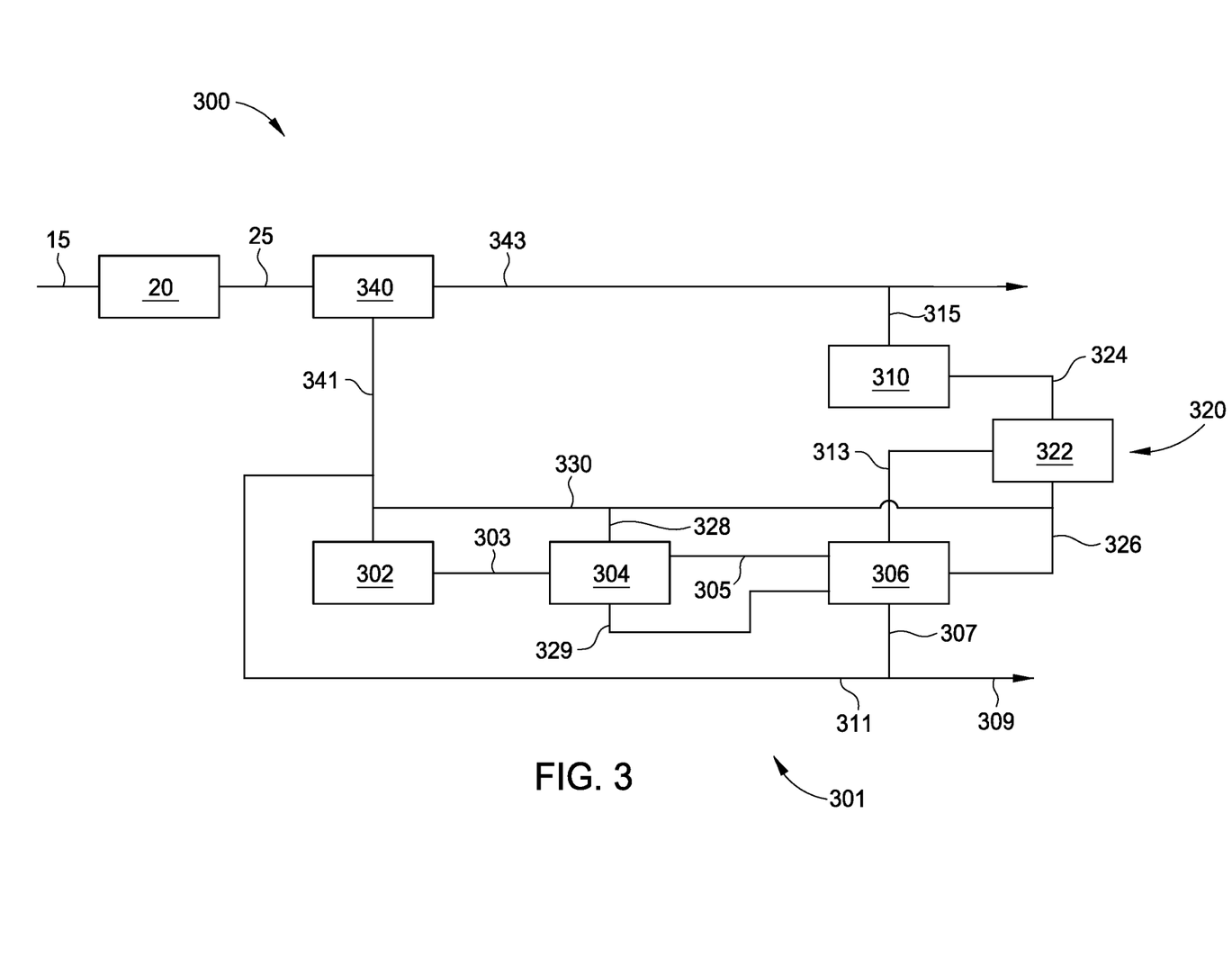
FIG. 3 is a schematic flow diagram of an acid gas removal system according to another embodiment.

FIG. 3 is a schematic flow diagram of an acid gas removal system 300 according to another embodiment. The system 300 includes a non-fractionation separation system followed by a fractionation separation system. The non-fractionation separation system performs a first separation between acid gases and hydrocarbon gases to produce an acid gas stream 341 with a gas ($CO_2$ and/or $H_2S$) concentration of at least 90 mol % and a hydrocarbon stream 343 with acid gas content less than 3 mol %. The non-fractionation separation system can include one or more of a membrane separation system, a pressure swing absorption (PSA) separation system, a molecular sieve separation system, and a solvent extraction separation system.

Using a non-fractionation separation prior to a fractionation separation avoids barriers associated with separating ethane ("$C_2$") from $CO_2$ by distillation. $C_2$ forms an azeotrope with $CO_2$ that has approximately 70 mol % $CO_2$ and 30 mol % $C_2$, which prevents separation of the two compounds purely by distillation. The azeotrope has a boiling point at about −6° C. and 34 bar. Using a non-distillation separation coupled with a distillation separation, an operational objective of the system can be selected by operating the non-distillation separation to target a composition either side of the $CO_2/C_2$ azeotrope point. Some, or most, $C_2$ is separated from the $CO_2$ and $H_2S$ in the non-distillation separation, and a feed stream substantially concentrated in $CO_2$ and $H_2S$ can be charged to a fractionator. If the feed stream has a $CO_2$ composition less than the $CO_2/C_2$ azeotrope point, the fractionator can be operated to purify $C_2$ overhead. If the feed stream has a $CO_2$ composition higher than the $CO_2/C_2$ azeotrope point, the fractionator can be operated to maximize $CO_2$ at bottoms. $H_2S$ does not form an azeotrope with either $CO_2$ or $C_2$, and is high-boiling relative to both, so $H_2S$ will generally emerge in the bottoms section of the fractionator.

The acid gas stream 341 is routed to a first compressor 302, which is similar to the compressor 40 of FIG. 2. The first compressor 302 is different from the compressor 40 in that a recycle stream 311, which is a slip stream taken from the $CO_2$ product stream to be described further below, is mixed with the acid gas stream 341 into the inlet of the first compressor 302. The first compressor 302 is thus configured to handle a larger volume, relative to the feed gas stream 15 rate, and higher concentration of $CO_2$ than the compressor 40. Thus, the first compressor 302 may be operated to compress the combined acid gas stream 341 and recycle stream 311 to an outlet pressure lower than the outlet pressure of the compressor 40, for example 350 psig to 600 psig, since the content of heavier gases in the compressor 302 is higher than in the compressor 40.

The compressor 302 produces a compressed stream 303 and routed to a cryogenic fractionation system 301. The compressed stream 303 is treated in a conditioner 304, which produces a cooled stream 305, which may be, or may include, liquid. The conditioner 304 includes one or more heat exchangers, and may also include one or more cryogenic expanders. The cooled stream 305 is charged to a fractionator 306, which may include more than one distillation column.

In the implementation of FIG. 3, a portion of the bottoms product 307 of the fractionator 306 can be recycled to the first compressor 302 in a recycle stream 311, while a portion is recovered as a bottoms product stream 309. Recycling a portion of the bottoms stream 307 from the fractionator 306 can increase separation of $CO_2$ and $H_2S$ from hydrocarbon in the fractionator 306, at the expense of increased energy consumption to handle the recycle volume. Recycling a portion of the bottoms stream from the fractionator 306 may be advantageous in embodiments where the content of $CO_2$ and/or $H_2S$ in the acid gas feed stream 15 is below about 10 mol %, making single-pass separation more challenging.

The fractionator 306 has a reflux system 320 with an overhead accumulator 322, which has a vapor space and a liquid portion. A liquid level may be maintained in the overhead accumulator 322. Vapor stream 313 from the fractionator 306 is cooled and routed to the accumulator 322, where some liquid is condensed. A reflux stream 326 returns the liquid from the accumulator 322 to the fractionator 306. A portion of the reflux stream 326 can be routed to the conditioner 304, if desired, for heat integration, or upstream of the conditioner 304 for recycle. These optional streams are respectively labelled 328 and 330 in FIG. 3. If a portion of the reflux is used only for heat integration, as in recycle stream 328, the liquid is heated by thermal contact with the compressed stream 303, and may partially or completely vaporize. A return stream 329 can be routed back to the fractionator 306 at a location appropriate to the thermodynamic state of the return stream 329. In cases where a portion of the reflux is recycled, as in recycle stream 330, the stream 330 is mixed with the acid gas stream 341 to the compressor 302 for re-introduction to the cryogenic system 301.

A vapor stream 324 from the accumulator 322 to be mixed with the hydrocarbon stream 343 is compressed by compressor 310 before mixing. The second compressor 310 produces a compressed hydrocarbon stream 315, which can then be combined with the hydrocarbon stream 343. Temperatures may be equalized, if desired, prior to mixing.

In one embodiment, the bottoms stream of the fractionator 306 is a high purity liquid $CO_2$ stream, which can be used for any suitable purpose. For example, the liquid $CO_2$ can be used in enhanced oil recovery, as a raw material for production of bio-based ethanol, as food grade $CO_2$, as a raw material for certain semiconductor processes, as a refrigerant, or the liquid $CO_2$ can be conveniently sequestered underground. Such sequestration can be designed to allow recovery of energy from the liquid $CO_2$ by adiabatic expansion, if desired.

In an embodiment where high purity liquid $CO_2$ is recovered in the bottoms product stream 309, the fractionator 306 produces an overhead stream 313 that is at least about 30 mol % hydrocarbon, most of which is $C_2$, but which may also contain small amounts of higher hydrocarbons including propanes, butanes, and pentanes (including normal and branched isomers). In such an embodiment, most of the higher hydrocarbons will emerge with the $CO_2$ (and any $H_2S$ present in the system) in the bottoms product stream 309. When the non-fractionation separation removes most hydrocarbon from the system prior to compression in the compressor 302, the flowrate of the overhead stream 313 is relatively small, for example about 10% of the feed to the fractionator 306 depending on composition of the various streams. In such an embodiment, recycling a portion of the bottoms stream 307 to the compressor 302 can increase purity of the $CO_2$ stream recovered in the bottoms product stream 309.

In an embodiment where $C_2$ is purified overhead in the fractionator 306, the fractionator 306 produces a bottoms stream 307 that is no more than about 70 mol % $CO_2$, and at least about 30 mol % $C_2$, with $H_2S$ and higher hydrocarbons recovered in the bottoms stream 307. The fractionator overhead stream 313 is at least about 90 mol % $C_2$, and can be higher depending on how the fractionator 306 is operated. For example, if a portion of the reflux is recycled as a recycle stream, impurities in the tower overhead will be reduced, at the expense of extra energy consumption.

The recycle modes and options depicted in FIG. 3 allow the cryogenic fractionation system 301 to be operated based on purifying $CO_2$ in the bottoms product stream 309 or based on purifying $C_2$ in the overhead vapor stream 324. A target composition of the acid gas stream 341 is selected with reference to the azeotrope point of $CO_2/C_2$, and the cryogenic fractionation system 301 is operated to produce purified $C_2$ if the acid gas stream is subazeotropic, or to produce purified $CO_2$ if the acid gas stream is superazeotropic.

Figure 4:
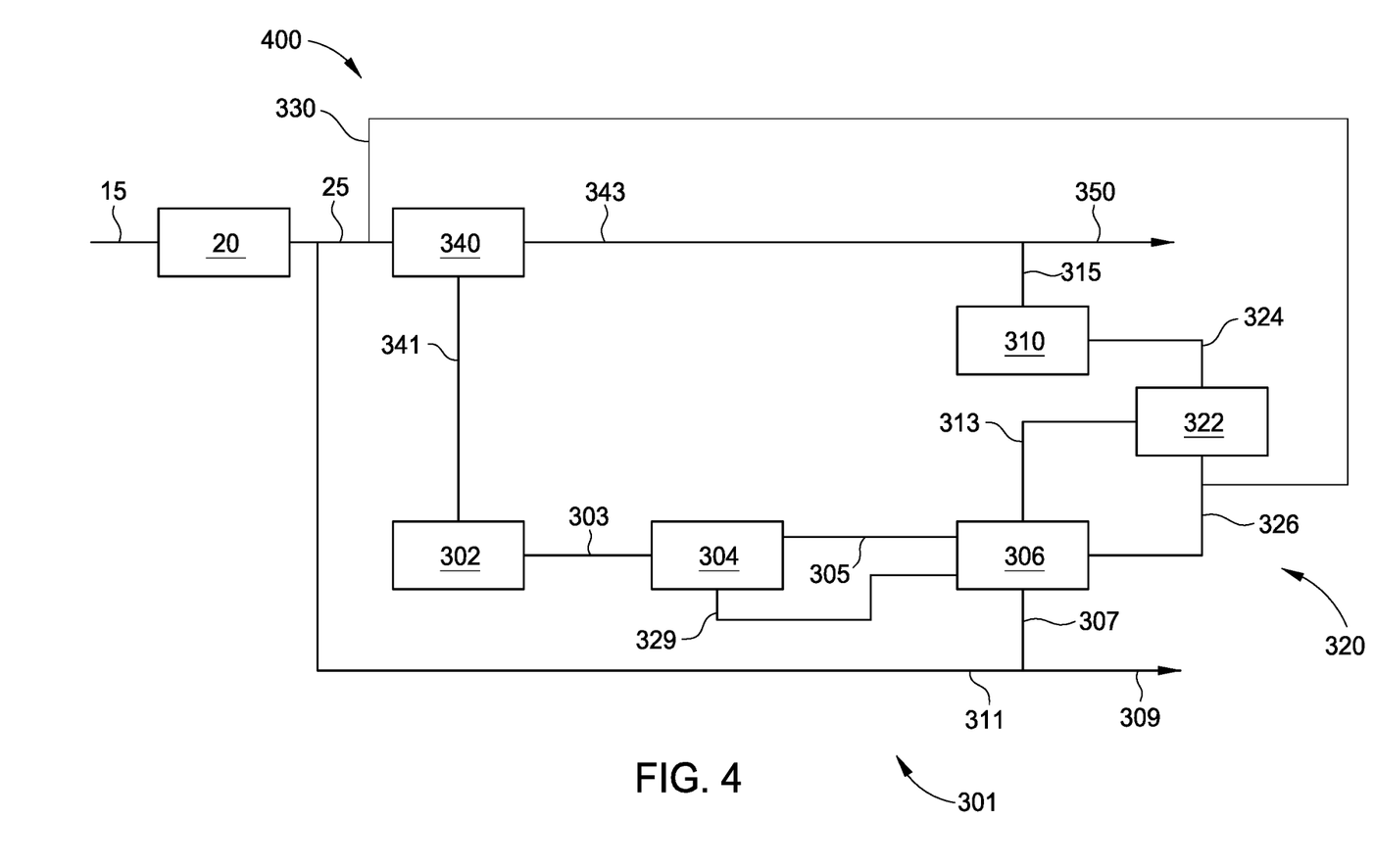
FIG. 4 is a schematic flow diagram of an acid gas removal system according to another embodiment.

FIG. 4 is a schematic flow diagram of an acid gas removal system 400 according to another embodiment. The acid gas removal system 400 is similar to the acid gas removal system 300, except that recycle streams from the fractionator 306 are recycled to the non-fractionation separator 340 for additional processing. A portion of the reflux stream 326 can be recycled to the non-fractionation separator 340 as recycle stream 330, in FIG. 4. Likewise, the portion 311 of the bottoms stream 307 can be recycled to the non-fractionation separator 340. Each stream is mixed with the pretreated gas stream 25 for entry to the non-fractionation separator 340.

Using a non-fractionation separation prior to fractionation allows separation of hydrocarbon from acid gases to be targeted according to the objective of the cryogenic fractionation system. For example, in a case wherein a feed gas stream contains 10 mol % $CO_2$, 10 mol % ethane, and 80 mol % methane, taking a hydrocarbon stream that is 2 mol % $CO_2$ and an acid gas stream that is 95 mol % $CO_2$ in the non-fractionation separator 340, with no bottoms recycle from the fractionator 306, results in a feed rate to the fractionator 306 that is approximately 9% of the feed gas stream flow rate. If the fractionator 306 is operated to produce a bottoms stream that is 99 mol % $CO_2$, with no bottoms recycle, the fractionator 306 overhead flow rate will be approximately 16% of the feed rate to the fractionator 306, and about 1.4% of the feed gas stream flow rate. The resulting hydrocarbon stream blended from non-fractionation separator 340 product and fractionator 306 overhead will be approximately 93% of the feed gas stream and will have approximately 3 mol % $CO_2$. In cases where one or both streams of the fractionator 306 are recycled to the non-fractionation separator 340, separation of hydrocarbon from acid gases can be improved by reintroducing $CO_2/C_2$ azeotrope to the non-fractionation separator 340 for further separation, resulting in less azeotrope being recovered at the cryogenic fractionation system 301. In some embodiments, the non-fractionation separator 340 can have variable capacity to handle different separation objectives. For example, multiple separation modules, such as membrane units, can be provided with flexible piping and valving to allow use of a desired number of modules depending on the degree of non-fractionation separation desired.

For membrane separation, CYNARA and/or APURA membrane systems available from the Process Solutions and Systems unit of Schlumberger Technology Corporation of Houston, Tex., can be used. Other membrane separation systems for high selectivity separation of acid gases such as $CO_2$ and $H_2S$ from hydrocarbon gases can also be used. Membrane systems can be used to recover, from a gas stream that is 10 mol % acid gases ($CO_2$ and $H_2S$), an acid gas stream that is 35-95 mol % acid gases. Such a system can be used to target an acid gas stream that is subazeotropic or superazeotropic in $CO_2$ and $C_2$.

In pressure swing absorption, an adsorbent is chosen that selectively separates acid gases from hydrocarbons. In particular, a separation between acid gases such as $CO_2$ and $H_2S$ from ethane is performed using a selected adsorbent, which may be, or include, activated carbon and metal-organic frameworks as examples. Bed lengths, cycling conditions, and number of beds can be optimized by persons skilled in the art to produce the acid gas stream 341 and hydrocarbon stream 343. Polymers are sometimes used, and may be treated with activated carbon or other adsorbent active for acid gases. Amines can be used for such cases, as well. Such systems can be used to recover an acid gas stream that is up to about 95 mol % acid gases from a gas stream that is 10 mol % acid gases.

Physical solvent absorption processes can be used for non-fractionation separation. Usable physical solvents for $CO_2$ extraction include N-methyl pyrrolidone, methanol, and propylene carbonate, among others. $CO_2$ is extracted into the solvent, which can then be effectively separated by distillation. The $CO_2$ can also be extracted in one step by extractive distillation. Such processes are known in the art, and can also recover an acid gas stream that is up to about 95 mol % acid gases from a 10 mol % acid gas stream.

The fractionation separation systems above can include any of the fractionators described above in connection with FIG. 2.

While the foregoing is directed to embodiments of the present disclosure, other and further embodiments of the disclosure may be devised without departing from the basic scope thereof, and the scope thereof is determined by the claims that follow.

What is claimed:

1. An acid gas purification system, comprising:
 a primary membrane system with a $CO_2$- and $H_2S$-enriched permeate stream effluent and a hydrocarbon stream effluent;
 a first compressor arranged to receive the $CO_2$- and $H_2S$-enriched permeate stream and produce a compressed stream; and
 a cryogenic separation system to receive the compressed stream,
 the cryogenic separation system including a conditioner followed by a frozen $CO_2$ fractionator, wherein the frozen $CO_2$ fractionator comprises a stripping section, a rectification section, and a mid-section, wherein the mid-section comprises a side processor comprising an empty section configured to return a solid to the frozen $CO_2$ fractionator, and wherein the side processor further comprises a condenser that produces a liquid level in the side processor, and
 wherein the frozen $CO_2$ fractionator produces a $CO_2$ and $H_2S$ liquid stream and a hydrocarbon gas stream, and the hydrocarbon gas stream is compressed in a second compressor and blended with the hydrocarbon stream effluent of the primary membrane system.

2. The acid gas purification system of claim 1, wherein the fractionator produces a bottoms stream, and a portion of the bottoms stream is recycled to the first compressor.

3. The acid gas purification system of claim 1, wherein the fractionator produces an overhead stream, and the hydrocarbon gas stream is obtained from the overhead stream.

4. The acid gas purification system of claim 1, wherein the fractionator produces a reflux stream, and a portion of the reflux stream is recycled as a recycle stream, which is heat-integrated with the compressed stream.

5. The acid gas purification system of claim 4, wherein the recycle stream is compressed in the second compressor and blended with the hydrocarbon stream effluent of the primary membrane system.

6. The acid gas purification system of claim 5, wherein the fractionator produces a bottoms stream, and a portion of the bottoms stream is recycled to the first compressor.

7. An acid gas purification system, comprising:
 a membrane separation unit that produces a permeate stream enriched in $CO_2$ and/or $H_2S$ and a retentate stream from a feed stream;
 a conditioner to reduce a temperature of the permeate stream; and a cryogenic fractionator to separate acid gases from the cooled permeate stream, the cryogenic fractionator having an overhead that is compressed and blended with the retentate stream, wherein the cryogenic fractionator is a frozen $CO_2$ fractionator comprising a stripping section, a rectification section, and a mid-section, wherein the mid-section comprises a side processor comprising an empty section configured to return a solid to the frozen $CO_2$ fractionator, and wherein the side processor further comprises a condenser that produces a liquid level in the side processor.

8. The acid gas purification system of claim 7, wherein the permeate stream is at least 95 mol % $CO_2$ and/or $H_2S$.

9. The acid gas purification system of claim 7, wherein the cryogenic fractionator produces a bottoms stream, and a portion of the bottoms stream is recycled to the conditioner.

10. The acid gas purification system of claim 7, wherein the cryogenic fractionator produces a reflux stream, and a portion of the reflux stream is recycled as a recycle stream, which is heat-integrated with the conditioner.

11. The acid gas purification system of claim 7, wherein the membrane separation unit is a polymer membrane unit.

12. An acid gas purification system, comprising:

a non-distillation separation system with an acid gas effluent and a separation gas effluent, wherein the non-distillation separation system is a single step separation and the acid gas effluent is at least 90 mol % $CO_2$ and/or $H_2S$; and a cryogenic fractionation system including a conditioner and a fractionator, wherein the cryogenic fractionation system produces an overhead stream that is compressed and blended with the separation gas effluent of the non-distillation separation system, wherein the fractionator is a frozen $CO_2$ fractionator comprising a stripping section, a rectification section, and a mid-section, wherein the mid-section comprises a side processor comprising an empty section configured to return a solid to the frozen $CO_2$ fractionator, and wherein the side processor further comprises a condenser that produces a liquid level in the side processor.

13. The acid gas purification system of claim 12, wherein the non-distillation separation system is one or more of a membrane system, a pressure swing adsorption system, and a solvent extraction system.

14. The acid gas purification system of claim 12, wherein the cryogenic fractionation system produces a bottoms stream, and a portion of the bottoms stream is recycled to the conditioner.

* * * * *